United States Patent Office 2,819,969
Patented Jan. 14, 1958

2,819,969

PASTE WARES OF HIGH BIOLOGICAL VALUE
AND A PROCESS OF MAKING SAME

Felix Grandel, Inningen, near Augsburg, Germany

No Drawing. Application August 25, 1954
Serial No. 452,201

Claims priority, application Germany August 29, 1953

2 Claims. (Cl. 99—85)

The present invention relates to paste wares and more particularly to paste wares and the like alimentary goods of high biological value, and to a process of making same.

This application is a continuation-in-part of my copending application Serial No. 439,125, filed June 24, 1954, entitled "Stable Debittered Cereal Flakes, and a Process of Making Same."

It is known to make paste wares, such as spaghetti, macaroni, vermicelli, noodles, and the like alimentary goods, from wheat flour of the most diverse degree of comminution or from wheat semolina. To improve taste and appearance of such paste wares and the like alimentary goods, fresh eggs, yolk, whole egg powder, or other egg products are added thereto. Appearance of such paste wares is also improved by the addition of suitable dyestuffs. Common salt and other ingredients are conventionally added to improve their taste.

The manufacture of dietetic paste wares which contain not only wheat flour but also rye flour, soybean flour, dehydrated vegetables, milk powder, milk sugar, and/or similar ingredients, is also well known.

Paste wares manufactured according to known methods from wheat flour, however, are poor in biologically active substances and vitamins. Special paste wares as they are produced for dietetic purposes are normally of dark color and frequently of objectionable taste.

Appearance and taste of standard paste wares from wheat flour or semolina, respectively, are always dependent upon the degree of comminution. The lighter the color of the wheat flour used for making paste wares, the better is their color and taste. When using in place of a superfine flour or of pure hard semolina a flour with a high bran content, the paste wares acquire a gray color and their taste is unsatisfactory. The cooking strength of such wares also decreases with increasing bran content of the flour. As a result thereof paste wares made of dark wheat flour are unsuitable for cooking.

The vitamin content of wheat flour, as is well known, is closely related to the degree of its comminution. For instance, whole grain meal still contains all or most of the active ingredients of the grain seed while superfine flour contains only small amounts of vitamins and vitamin-like substances. This is due to the fact that, on grinding, the cereal germ, i. e. that part of the grain seed which is very rich in vitamins is separated and removed. Consequently superfine flour represents almost nothing more than a dead caloric food supply. Such a superfine flour lacks all the active ingredients of the latent cereal germ, among them vitamins, important trace elements, and essential amino acids. Paste wares made from such superfine flour or hard semolina, therefore, are not considered as being of perfect biological value.

In order to produce paste wares of high biological value, attempts have been made to make such wares from whole grain meal. However, the resulting wares are of dark color, mottled appearance, and of poor cooking strength.

Furthermore, attempts have been made to add cereal germs separated and removed on grinding grain seeds as a whole or in form of a flour to the paste wares. These attempts also did not yield satisfactory results. The taste of paste wares made in this manner and their appearance and cooking strength are considerably impaired by such additions. Such paste wares, furthermore, become rapidly rancid due to the high fat content of the added cereal germs and are then completely unpalatable.

It is one object of the present invention to provide paste wares of high biological value and excellent taste and appearance, said paste wares containing all the active ingredients and vitamins of the grain seed, being of satisfactory cooking strength and not becoming rancid on storage.

Another object of the present invention is to provide a simple and effective process of producing such paste wares of high biological value and excellent taste, appearance, cooking strength, and storage properties.

A further object of the present invention is to provide a new and effective process which permits the production of stable germ flours in highly comminuted form by milling and grinding in highly effective milling and grinding devices, said germ flours being well adapted to be added to paste wares in order to improve their biological value without impairing their taste, appearance, and other properties.

Still another object of the present invention is to provide very finely comminuted cereal germ flours which are stable even on prolonged storage and are substantially free of any bitter taste and rancidity, said germ flour being especially adapted to improve the biological value of paste wares, such as macaroni, spaghetti, vermicelli, noodles, and the like alimentary goods.

Other objects of the present invention and advantageous features thereof will become apparent as the description proceeds.

In principle, paste wares made of superfine wheat flour are converted, according to the present invention, into products of high biological value, excellent taste, appearance, cooking strength, storage properties, and other advantageous properties by admixing specially prepared partly de-oiled and de-bittered cereal germ flakes to such superfine wheat flour.

The process of preparing such de-bittered cereal germ flakes consists, in principle, in first removing a substantial amount of the oil present in cereal germs, for instance, by hydraulic pressing and/or by extraction with solvents for oils. The de-oiled cereal germs must not contain more than 4% of oil. Such substantially de-oiled cereal germs can then readily be milled and ground without technical difficulties on roller mills. The production of superfine flour from such ground and milled, substantially de-oiled cereal germs by sifting and sieving does not cause any difficulty.

The resulting germ flours are comparatively stable, due to their low oil content. They can be stored in the same manner as wheat flour without becoming rancid. However, they often possess a bitter taste which limits their use as foodstuff. It has been found that the bitter taste of such germ flours is dependent upon their degree of comminution. Flours which have been ground only to a low degree of comminution and have as low a content of crude fiber and bran particles as possible, have the best taste while highly comminuted flours which contain large amounts of bran contain also large amounts of bitter components.

This observation proves that the bitter components of cereal germs are mainly enriched in bran and husk components of said material. Therefore, only germ flours of low degree of comminution are suitable for the production of a starting material which can be used in the manufacture of cereal germ flakes. It has been found that the degree of comminution must not be higher than 50%.

According to the present invention it has been found that cereal germ flakes of pleasant taste and free of bitter components can be produced from such a fine germ flour ground in highly effective grinding and milling devices in the manner described hereinafter by converting such germ flour into a dough by kneading with water or other liquids such as milk, fruit juices and the like, and by drying such dough under specific conditions on a roller dryer of specific construction.

It is known to dry solid and liquid materials on roller dryers. It has, however, been found by extensive experiments that cereal germ flakes free of bitter components can economically and practically be produced only when using special drying apparatus as they are employed in the potato flake industry. Such potato flake roller dryers differ from other roller dryers:

(a) By the very considerable circumference of their rollers, (b) By their feeding device which operates by means of rubber rollers, (c) By their rate of revolutions which is comparatively low and, therefore, subjects the germ flour to considerably prolonged contact with the drying roller surface. Entirely unsuitable for the production of cereal germ flakes which are free of bitter components are belt-type dehydrators or conveyer drying machines, disc dryers, dryers with only a single roller, twin-cylinder syray-drying machines and similar types of dryers, and also roller dryers as they are used, for instance, in producing dried milk or dried yeast.

It has furthermore been found that debittering of cereal germ flakes on such flaking rollers is achieved only when working within very definite temperature ranges. Preferably such debittering is carried out at a temperature between about 130° C. and about 140° C. Thereby the rotation of the rollers is to be adjusted in such a manner that the flakes are heated to said temperature only for a short period of time so that they cannot burn. Furthermore, it has been found that maintaining such a temperature range is not only necessary in order to effect sufficient debittering but that heating to such a high temperature of 130–140° C. for a short period of time causes the lowest possible losses in vitamins.

A number of cereal germs contain bitter components which cannot completely be eliminated by said treatment on roller dryers at 130–140° C. They are, however, split up and, thus, eliminated by a treatment with sodium carbonate or sodium bicarbonate. Thereby cereal germ flakes of satisfactory taste are obtained provided certain specific conditions are observed. It has been found that the amount of sodium carbonate or sodium bicarbonate to be added is to be adjusted according to the degree of acidity of the germ flour. Said degree of acidity is determined according to the method of Schulerud. Said method indicates how many cc. of N/10 potassium hydroxide solution are necessary to neutralize the fatty acids present in 10 g. of flour. The addition of sodium carbonate or sodium bicarbonate according to the present invention not only removes the bitter components from said flour but also neutralizes the fatty acids.

Complete debittering of the cereal germ flours to be converted into flakes can be achieved by adding, during flaking, such amounts of sodium carbonate or sodium bicarbonate as are equivalent to the degree of acidity of said flour. If smaller amounts of said sodium carbonate or sodium bicarbonate are added, no debittering effect takes place because the free fatty acids are first neutralized before the bitter components which are glucoside compounds can be hydrolyzed. If larger amounts of such sodium carbonate or sodium bicarbonate are added to said flour, the flakes acquire a soapy taste. The addition of other alkali carbonates or alkali bicarbonates than sodium carbonate or sodium bicarbonate did not yield satisfactory results because such other alkali compounds unfavorably effect the taste of the treated flakes.

It has been found that such debittered cereal germ flakes are of very agreeable taste. This improvement in taste is effected by maintaining the above mentioned temperature range on flaking the flour by means of rollers and is caused by caramelization of the sugar and the milk. The crude flakes leaving the potato flake dryer and the cooling tower are, for instance, equalized by passing them through a tearing apparatus comprising a toothed roller. The equalized flakes are then graded and sorted by a cascade cleaning machine while the dust carried along by the aspirator is recovered by means of a tubular revolving filter.

The following examples serve to illustrate the present invention without, however, limiting the same thereto:

*Example 1*

Corn germs as they are obtained according to the dry-degerminating process of Dr. Grandel or obtained on grinding and milling corn, or corn germs obtained in the cornstarch production by the flotation process, are extracted with benzine. Said extraction is preferably carried out in apparatus as they are used in oil mills for extracting oil seeds. The resulting extraction residue contains about 1% of fat. It is then finely ground in conventional milling apparatus. Grinding and milling is effected in such a manner that a 50% superfine flour is produced.

The superfine flour is mixed with about 30% to about 50% of its weight of water and the mixture is thoroughly kneaded in an endless screw-type mixer. Said moist flour is then conducted, by means of a conveyer device, to a roller dryer provided with feeding and supplying rollers, such as they are used in the manufacture of potato flakes. The dryer should have a roller length of at least 2 m. and a roller diameter of at least 1 m. The rollers are preferably driven by a regulating-speed gear. The rollers are preferably heated by means of steam. The steam pressure within the rollers is adjusted in such a manner that the temperature of said rollers is about 130° C. to about 140° C.

Thoroughly kneaded flour paste is then supplied to said roller dryer and the speed of rotation is adjusted in such a manner that well dried flakes are obtained. Said flakes are of light brown color and have an agreeable nut-like taste. The flakes falling off said roller dryer are sifted and purified by means of air separators and are sieved over coarse sieves. This operation is necessary to prevent contamination of said flakes by moist and/or dry lumps of the paste to be dried which might fall off from the dryer. The flakes, after such purification, have a water content of 4–6%.

*Example 2*

Rice germs are subjected to the action of hydraulic presses. The expressed residues are ground and milled to a superfine flour as described in Example 1. The 50% superfine flour has a degree of acidity (determined according to the method of Schulerud) of 15. 100 kg. of said rice germ flour are mixed with 100 liters of water containing dissolved therein 795 g. of sodium carbonate or 1.260 kg. of sodium bicarbonate. The mixture is converted into a paste by means of an endless screw-type mixer and is then transformed into flakes by means of a roller mill. The resulting flakes are of very agreeable taste free of any bitter material.

Roller or drum dryers as they are used in the process according to the present invention operate in such a manner that the pastry material is applied to a revolving heated metal drum which conducts heat to the wet film spread over the surface of said roller or drum and thereby evaporates the water during partial revolution of the drum. The dry material is scraped from the drum by a stationary knife. The most preferred roller or drum dryers used in the process according to the present invention are double-drum dryers in which the direction of rotation is downward. Care must be taken that the reservoir for feeding the cereal germ paste to said double-drum dryer is separated from said heated drums. This is best achieved by using a single or double transfer roll for transferring the paste to the drums. Such transfer rolls, in contrast to the drying rollers or drums, are not heated. Thereby is eliminated that the paste to be dried remains in contact with the drying drums for too long a period of time and, consequently, is adversely affected by the high drying temperature. Twin-drum dryers having two drums turning in a direction opposite to the double-drum dryer, i. e. upwardly, may also be used. The cereal germ paste is also transferred to the drum surface by means of a single or double unheated transfer roll. Such transfer roll or rolls may also be placed near the top of the drum. Single or multiple roller or drum-dryers may likewise be used if provided with transfer rolls for applying the paste to said rollers or drums. Preferably the rollers or drums are provided with several smoothing rolls which continuously smoothen the drying paste layer that initially, due to vigorous evaporation, becomes uneven and rough, and which firmly press and force said paste layer against the drying roller or drum, thus, ensuring satisfactory heat transfer and, as a result thereof, better drying performance.

In principle, drying of the cereal germ paste to yield flakes requires a drying process whereby the paste to be dried is applied to a moving drying surface of heat conducting material heated from the side opposite to said drying surface. The material to be dried is exposed to drying heat only for a comparatively short period of time sufficient to form flaky dried material. Thereby the paste to be dried before being supplied to the drying surface and the drying surface are not in direct contact with each other so that the drying surface does not cause substantial increase in the temperature of said paste and, thus, does not adversely affect its composition nor its nutritional value.

Since the general construction and the details in dryers of this roller or drum-dryer type are well known and familiar to those skilled in the art, and since said dryers are large and elaborate structures it is not considered to be necessary for an understanding of this invention to illustrate and describe the same.

The same applies to the cascade cleaning machines which are used, for instance, for sorting, grading, and purifying semolina and the like products. Such a machine sorts and grades the starting semolina according to its specific gravity and operates with wind suction or aspiration. The cereal germ flakes are uniformly and steadily supplied to such a machine by means of feeding rollers and adjustable inlet flaps or shutters. Heavy semolina or middlings are deposited in the front chambers and light semolina or middlings in the rear chambers. Such machines are well known to the art and need not be described in detail herein.

As tearing apparatus for equalizing the crude flakes leaving the dryer there may advantageously be used crushing devices of the type employed in crushing oilseed cakes and the like.

Dry-degerminating of grain seeds according to the process developed by Dr. F. Grandel is, for instance, carried out according to the process and with the device described in German Patents No. 715,156 and 729,662. Of course, other processes of separating germs from cereal seeds in the dry state, i. e. without any moistening of said seeds, may also be used.

The partly de-oiled cereal germs are preferably ground according to the type of flour grinding processes wherein the material to be ground is passed through several grinding steps. The material, during the first grinding steps, is merely crushed and broken up to comparatively large grit-like particles, large particles of the cereal grain shells or husks, and only a very small percentage of the fine flour. The shell or husk particles and the fine flour are separated and the large grit-like particles are more and more reduced in size by subsequent grinding steps. Thereby the shell or husk particles which are still present in the material to be ground are more and more and finally almost completely separated from the superfine flour particles obtained in the last grinding steps. In this manner it is possible to substantially remove all the fiber and bran particles present in the starting de-oiled germs. In contrast to such a "high grinding process," the "flat grinding process," whereby a large quantity of flour is obtained on the first passage through the grinding device, yields a cereal germ flour which is not as suitable for conversion into flakes since it contains considerably higher amounts of bitter components present in the bran and husks of the cereals.

Determination of the degree of acidity according to the method of Schulerud mentioned hereinbefore, is carried out as described, for instance, in "Cereal Chem.," vol. 10, page 129 (1933). Said method consists in principle in extracting 10 g. of flour with 100 cc. of 67% ethanol and titrating the alcoholic extract with N/10 sodium hydroxide solution and phenolphthalein as indicator.

It may be mentioned that the degree of comminution as indicated by the term "50% superfine flour," comprises a flour which contains at the most 50% of the shells or husks of the starting cereal material. Accordingly a superfine flour between 0% and 50% contains considerably less crude fiber, pentosans, proteins, and mineral matter than a less fine flour between 51 and 80%.

As stated above, the highest possible oil content in cereal germ flakes obtained according to the process of this invention as described hereinbefore, is about 4%. The lowest oil content should not be substantially lower than about 1%. The preferred oil content is between 2% and 3%. Cereal germs which have been partly de-oiled by the extraction process are usually not as suitable as those which have been partly de-oiled by pressing. Such pressed cereal germs ordinarily contain larger amounts of vitamins and other active ingredients than extracted cereal germs.

It is known to debitter germs of cereals by roasting or by a treatment with alkali hydroxide solutions and to further process such debittered germs of cereals to food preparations. It is furthermore known to grind germs of cereals and to subject the resulting flour to a drying, roasting, mashing, fermenting, and the like process and to admix thereto other suitable materials.

All the heretofore known and used processes which are concerned with the improvement of germs of cereals, yield the desired result only incompletely. Either it was found that such processes can be carried out in practical operation only in an uneconomical manner and/or with great difficulties or the resulting final products are bitter and of disagreeable taste.

As stated above, it is known to grind germs of cereals. However, the oil content of the germs of cereals renders such a grinding process very difficult. When using germs of a high oil content such as, for instance, corn germs, it is almost impossible to carry out such grinding process. When aiming at the production of very finely comminuted germ flours by means of highly effective grinding and milling devices, said grinding and milling devices and sieves are smeared and become fouled by the high oil content of said cereal germs so that it becomes very rapidly impossible to technically carry out such operations. Furthermore, the resulting flours which are rich in oil are bitter and rapidly become rancid. The oil which is set free during grinding and milling is present at the surface of said flour particles and, therefore, is rapidly oxidized by atmospheric oxygen. Such flours rich in oil become unpalatable within a few days and the germ oil contained therein is split up to free fatty acids in an amount corresponding to about 80%. All these disadvantages and drawbacks of cereal germ flours as they were produced heretofore, are overcome by the process according to the present invention as described hereinbefore.

The resulting cereal germ flakes are, as stated above, excellent additives in the production of paste wares made of superfine wheat flour and considerably increase the biological value of such wares. They may, however, also be used for other purposes. Thus, for instance, other materials, such as milk powder, sugar, citric acid, flavoring materials and others may be added to the cereal germ flour during flaking. In this manner a savory breakfast or baby food is obtained. It is surprising that in such mixtures the taste of the flakes is even more agreeable than the taste of the mixture itself. The following example serves to illustrate the manufacture of such a baby food and breakfast cereal.

*Example 3*

Corn germs obtained on dry-degermination of corn are de-oiled by subjecting them to the action of hydraulic presses. The resulting oil cakes have an oil content of about 4% and are ground and milled to a superfine flour as shown in Example 1. The resulting superfine flour is then mixed with 30% of dry buttermilk powder, 20% of sugar, 0.1% of citric acid, and 0.5% of table salt. The mixture is thoroughly kneaded with 50% of its weight of water and 50% of its weight of buttermilk and is flaked at 130–140° C. as described in Example 1. The resulting flakes are purified in the same manner as described in Example 1. They represent an excellent baby food and can also be used as breakfast cereal flakes.

Other uses of such debittered cereal germ flakes are in the manufacture of dietetic food preparations, pharmaceutical preparations, in the confectionery industry and the like. The following example serves to illustrate the manufacture of a cereal germ flake preparation which can be used as food for diabetics.

*Example 4*

Wheat germs are de-oiled by means of hydraulic presses. The resulting wheat germ cake is finely ground and milled to yield a 50% superfine flour. Said flour is mixed with 30% of soybean flour and 30% of Jerusalem artichoke flour. 100 kg. of said mixture are thoroughly kneaded with 100 liters of water containing an amount of sodium carbonate or sodium bicarbonate corresponding to the acid content of said mixture. The resulting paste is then converted into flakes by means of a roller dryer as described in the preceding examples.

The residues obtained on grinding the de-oiled germs before flaking are also very valuable products. They can either be used as such or after addition of diastatic ferments as feed for young animals, especially calves. They may first be subjected to an enzymatic treatment as this is described more in detail in German Patent No. 840,047.

Cereal germs and especially wheat germs which are partly de-oiled, preferably by pressing in hydraulic presses, and are then ground to a superfine flour as described hereinbefore, are added, according to a further embodiment of the present invention, either as such without further treatment or after debittering and flaking as also described hereinbefore to superfine wheat flour used in the manufacture of macaroni, spaghetti, vermicelli, noodles, and other paste wares in order to improve their biological value and other properties. Preferably, amounts between about 3% and about 5% of said cereal germ flakes are admixed to said superfine flour. Said amounts may be higher or lower but should not exceed about 10% and should not be lower than 1%. A mixture of superfine wheat flour, 1% to 10% and preferably 3% to 5% of partly de-oiled cereal germ flour obtained as described hereinbefore and, if desired, of other conventional additives, such as salt, eggs, egg yolk, milk, lecithine, gluten, dyestuffs, such as safflower, annatto, turmeric, or synthetic food dyestuffs, preserving agents, such as boric acid, benzoic acid (introduced into the paste wares by the addition of preserved dried eggs, yolk, or milk), and other milled goods, such as rye or corn flour, potato or corn starch, or soybean flour, is then kneaded with warm water to form a homogeneous dough. Said dough, after rolling, is cut to ribbons or pressed to filaments, tubes, or other shape and form. The resulting formed paste wares are then dried, preferably by conducting cold or moderately heated air thereover until they have the necessary strength. Paste wares obtained with the addition of cereal germ flour are of surprisingly light color and appearance and do not differ in their taste from standard paste wares. Their cooking strength, i. e. their property not to disintegrate to a paste on cooking but to preserve their shape and form is excellent and their storage property is like that of standard paste wares.

It is very surprising and contrary to expectations that, by working up cereal germs according to the present invention, it is possible to employ such cereal germ material for improving the biological value of standard paste wares, such as macaroni, spaghetti, vermicelli, noodles and the like and to produce paste wares of high biological value which contain substantially all the active ingredients of the latent cereal germ in about the same amount as they are present in whole grain and which, nevertheless, are of light color and agreeable taste.

The following example serves to illustrate the present invention without, however, limiting the same thereto.

*Example 5*

Wheat germ press cake obtained by pressing crushed wheat germs in hydraulic presses and containing between 3% and 4% of oil, are crushed in a crushing device to pieces of walnut or hazelnut size. The resulting coarse meal is further comminuted by means of a grinding mill and is milled according to known milling operations to various degrees of fineness. The procedure to be followed is the same as employed in the production of wheat flour. By sifting and bolting various fractions of wheat germ flour are obtained which may be designated as wheat germ powder, fine wheat germ flour, wheat germ dust, wheat germ tailings, wheat germ middlings, and wheat germ bran. The fine fractions are mixed with each other to yield a 20–30% superfine wheat germ flour. Such a wheat germ flour has about the following composition:

0.5–2.0% of crude fiber,
3.0–4.0% of oil,
23.0–25.0% of protein,
45.0–50.0% of nitrogen-free extractive matter,
8.0–10.0% of moisture, and
4.0–5.0% of ash.

Said wheat germ flour contains the entire vitamin B complex and, for instance, per 100 g. the following amounts of vitamins:

3,000 γ of vitamin $B_1$,
800 γ of riboflavin (vitamin $B_2$),
4 mg. of nicotinic acid (niacin)
9 mg. of pyridoxine (vitamin $B_6$),
1 mg. of pantothenic acid,
500 international units of vitamin A,
25,000 γ of vitamin E,
15,000 Shep. L units of provitamin F,
75,000 Avena units of auxin, and
210,000 Saccharomyces units of Bios factors.

In contrast hereto, 20–30% superfine wheat flour has the following composition:

1.4% of oil,
14.0% of protein,
83.0% of nitrogen-free extractive matter,
0.5% of ash and contains about the following amounts of vitamins per 100 g.:

75 γ of vitamin $B_1$,
50 γ of riboflavin (vitamin $B_2$),
30.0 international units of vitamin A,
3,000 γ of vitamin E.

It is evident that even an addition of only a few percent of wheat germ flour according to the present invention to superfine wheat flour considerably increases the vitamin content of such superfine wheat flour and of macaroni, spaghetti, vermicelli, noodles, and other paste wares made therefrom. For instance, addition of only 5% of said wheat germ flour produces the following increases in the vitamin content of the original wheat flour:

| Original wheat flour: | Wheat flour fortified by wheat germ flour | Increase, percent |
|---|---|---|
| 75γ, vitamin $B_1$ | 225γ | 200 |
| 50γ, riboflavin | 90γ | 80 |
| 30 I. U., vitamin A | 55 I. U. | 80 |
| 3,000γ, vitamin E | 4,250γ | 40 |

Furthermore, a number of vitamins which are not present in superfine wheat flour, are added thereto by the admixture of wheat germ flour according to the present invention.

I claim:

1. In a process of producing macaroni, spaghetti, vermicelli, noodles, and the like paste wares of high biological value, the steps comprising admixing cereal germ flakes to superfine wheat flour and other ingredients of paste wares and converting said mixture into paste wares, said cereal germ flakes being prepared by providing an aqueous paste of a partially de-oiled cereal grain germ material, having an oil content between about 1% and about 4%, ground and milled to a superfine flour and having a low content of crude fiber and bran particles, and drying said paste in a moving thin layer with only short exposure to heat to form flakes, thereby causing heat transfer indirectly to said thin layer of paste from one side only through metallic heat conductor material, said paste substantially not being affected by and substantially not being heated by contact with the drying zone.

2. In a process of producing macaroni, spaghetti, vermicelli, noodles, and the like paste wares of high biological value, the steps comprising admixing cereal germ flakes to superfine wheat flour and other ingredients of paste wares and converting said mixture into paste wares, said cereal germ flakes being prepared by providing an aqueous paste of partially de-oiled cereal grain germ material, having an oil content between about 1% and about 4%, ground and milled to a superfine flour and having a low content of crude fiber and bran particles, the free fatty acid content of said paste being neutralized by the addition of an amount of alkali equivalent thereto, and drying said paste in a moving thin layer with only short exposure to heat to form flakes, thereby causing heat transfer indirectly to said thin layer of paste from one side only through metallic heat conductor material, said paste substantially not being affected by and substantially not being heated by contact with the drying zone.

References Cited in the file of this patent

UNITED STATES PATENTS

| Re. 22,748 | Levin | Apr. 30, 1946 |
| 1,586,869 | Wesner | June 1, 1926 |
| 2,135,445 | Walsh | Nov. 1, 1938 |
| 2,230,417 | Wellinghoff | Feb. 4, 1941 |
| 2,357,312 | Cryns | Sept. 5, 1944 |